UNITED STATES PATENT OFFICE.

FRITZ QUADE, OF BERLIN, GERMANY, ASSIGNOR TO THE FIRM OF JOHANN A. WÜLFING, OF BERLIN, GERMANY.

METHOD OF PRODUCING WATER-SOLUBLE CRYSTALLINE ALUMINUM FORMATE AND PRODUCT OBTAINED THEREBY.

1,030,747. Specification of Letters Patent. Patented June 25, 1912.

No Drawing. Application filed July 25, 1910. Serial No. 573,769.

*To all whom it may concern:*

Be it known that I, FRITZ QUADE, doctor of chemistry, a citizen of the Empire of Germany, residing at Berlin, in the Empire of Germany, have invented a new and useful Method of Producing Water-Soluble Crystalline Aluminum Formate and Product Obtained Thereby, of which the following is a specification.

My invention relates to a water soluble crystalline aluminum formate which is particularly suitable in the form of tablets for the preparation of disinfecting aqueous solutions.

Heretofore aluminum formate has been known and has been commercially available only in the form of its aqueous solutions. The literature contains no description of the production of a solid crystalline water-soluble aluminum formate. Thus by decomposing equivalent quantities of barium formate with aluminum sulfate and evaporating the filtrate from the barium sulfate only a gummy mass is obtained (see Schmidt, *Pharm. Chemie*, vol. II, part 1, p. 353, 4th ed., published by Vieweg 1901).

Now I have discovered that out of a solution of wet aluminum hydroxid in 95% formic acid, there is precipitated on careful evaporation on the water bath, a crystalline water-soluble salt, with a content of 11.6% of aluminum. From aqueous solutions this compound cannot be again obtained by recrystallizing as is possible, for instance, with the basic chromium formate

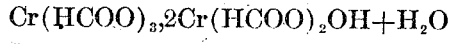
$Cr(HCOO)_3, 2Cr(HCOO)_2OH + H_2O$ as described by Haeusermann, *Journal für Prakt. Chemie* vol. 50, (1894), p. 384.

A compound containing 11.6% of aluminum and soluble in cold water can also be obtained if the aqueous solution of aluminum formate obtainable in commerce is evaporated with the addition of concentrated formic acid to the beginning of the formation of a crust, and is then left to crystallize at a temperature of from 25 to 30 degrees C. The crystalline cake can be freed from adherent traces of free formic acid by washing with ether.

The easily soluble non-hygroscopic and permanent salts of the present invention have application for pharmaceutical purposes.

A soluble solid aluminum acetate cannot be obtained in this manner.

I claim:

1. The method of producing a water-soluble crystalline aluminum formate which comprises evaporating a solution of aluminum formate in the presence of an excess of formic acid and allowing the same to crystallize.

2. The method of producing a water-soluble crystalline aluminum formate which comprises preparing a concentrated solution of aluminum formate, evaporating to incipient crystallization in the presence of an excess of formic acid, and allowing the same to crystallize.

3. The method of producing a water-soluble crystalline aluminum formate which comprises preparing a concentrated solution of aluminum formate, evaporating to incipient crystallization in the presence of an excess of formic acid, and crystallizing at a temperature of 25 to 30° C.

4. The hereindescribed method of producing a water-soluble crystalline aluminum formate which comprises dissolving wet aluminum hydroxid in concentrated formic acid in excess to form a concentrated solution of aluminum formate in formic acid, evaporating to the formation of a crust and crystallizing at a temperature of 25 to 30° C.

5. In the manufacture of aluminum formate the process which comprises crystallizing aluminum formate from its solutions in the presence of an excess of formic acid.

6. As a new product a stable crystalline non-hygroscopic compound of aluminum and formic acid, soluble in water.

In testimony whereof I affix my signature in presence of two witnesses.

FRITZ QUADE.

Witnesses:
MAX LEMCKE,
LOUIS VANDORY.